(12) United States Patent
Chang et al.

(10) Patent No.: US 11,044,579 B2
(45) Date of Patent: Jun. 22, 2021

(54) METHOD AND APPARATUS FOR DYNAMIC GEO-FENCING

(71) Applicant: XAD, INC., New York, NY (US)

(72) Inventors: Chi-Chao Chang, Palo Alto, CA (US); Prakash Muttineni, San Ramon, CA (US); Srihari Venkatesan, Cuppertino, CA (US); Mauricio Mediano, Campbell, CA (US); Dipanshu Sharma, New York, NY (US)

(73) Assignee: xAd, Inc., New York, NY (US)

( * ) Notice: Subject to any disclaimer, the term of this patent is extended or adjusted under 35 U.S.C. 154(b) by 452 days.

(21) Appl. No.: 15/915,908

(22) Filed: Mar. 8, 2018

(65) Prior Publication Data

US 2018/0199152 A1   Jul. 12, 2018

Related U.S. Application Data

(63) Continuation of application No. 13/867,025, filed on Apr. 19, 2013, now abandoned.
(Continued)

(51) Int. Cl.
*H04W 4/029* (2018.01)
*G06F 16/29* (2019.01)
(Continued)

(52) U.S. Cl.
CPC ........ *H04W 4/029* (2018.02); *G06F 16/2228* (2019.01); *G06F 16/29* (2019.01);
(Continued)

(58) Field of Classification Search
CPC .............................. H04W 4/029; G06F 16/93
See application file for complete search history.

(56) References Cited

U.S. PATENT DOCUMENTS

| 7,574,661 B2 | 8/2009 | Matsura et al. |
| 2002/0111172 A1 | 8/2002 | DeWolf et al. |

(Continued)

OTHER PUBLICATIONS

Groundtruth, Inc., International Search Report / Written Opinion, PCT/US2018/055293, Dec. 21, 2018, 9 pgs.
(Continued)

*Primary Examiner* — Van H Oberly
(74) *Attorney, Agent, or Firm* — USCH Law, PC

(57) ABSTRACT

The present disclosure provides method and system to facilitate definition, tuning and visualization of a geo-fence at a computer system. The method comprises receiving an application program interface (API) call from the computer system, and in response to the API call, enabling the computer system to display a user interface (UI) on a display screen of the second computer system. The UI includes a first region and a second region, the first region including a plurality of screen areas for receiving input parameters for defining the geo-fence via a user input device of the computer system, and a second region is configured to display the geo-fence over a map of a geographical region around a location specified in the input parameters. The method further comprises, in response to receiving user inputs in the second region, generating the geo-fence based on the input parameters and mobile device events data stored in an electronic storage. The method further comprises causing the geo-fence to be displayed over the map in the second region of the UI.

20 Claims, 12 Drawing Sheets

Related U.S. Application Data

(60) Provisional application No. 61/724,295, filed on Nov. 8, 2012, provisional application No. 61/724,298, filed on Nov. 8, 2012, provisional application No. 61/724,299, filed on Nov. 8, 2012.

(51) Int. Cl.
  *G06F 16/93* (2019.01)
  *G06F 16/22* (2019.01)
  *G06Q 30/02* (2012.01)
  *H04L 29/08* (2006.01)
  *H04W 4/021* (2018.01)

(52) U.S. Cl.
  CPC ......... *G06F 16/93* (2019.01); *G06Q 30/0205* (2013.01); *G06Q 30/0261* (2013.01); *H04L 67/20* (2013.01); *H04W 4/021* (2013.01)

(56) References Cited

U.S. PATENT DOCUMENTS

| | | | |
|---|---|---|---|
| 2003/0064735 A1 | 4/2003 | Spain et al. | |
| 2006/0156209 A1 | 7/2006 | Matsura et al. | |
| 2007/0026870 A1 | 2/2007 | Spain et al. | |
| 2007/0233631 A1 | 10/2007 | Kobayashi et al. | |
| 2010/0312599 A1 | 12/2010 | Durst | |
| 2011/0081634 A1 | 4/2011 | Kurata et al. | |
| 2011/0099045 A1 | 4/2011 | Carr et al. | |
| 2011/0244919 A1 | 10/2011 | Aller et al. | |
| 2012/0008526 A1* | 1/2012 | Borghei | H04W 4/022 370/254 |
| 2012/0053991 A1 | 3/2012 | Shimizu et al. | |
| 2012/0179534 A1 | 7/2012 | Moukas et al. | |
| 2012/0284769 A1 | 11/2012 | Dixon et al. | |
| 2013/0006522 A1 | 1/2013 | Vellaikal et al. | |
| 2013/0066818 A1 | 3/2013 | Assadollahi et al. | |
| 2013/0073388 A1 | 3/2013 | Heath | |
| 2016/0309292 A1* | 10/2016 | Kerr | G06Q 30/02 |

OTHER PUBLICATIONS

XAD, Inc., Extended Search Report, EU 16863131.5, dated Jun. 13, 2019, 12 pgs.

XAD, Inc., International Preliminary Report on Patentability, PCT/US2016/060727, dated May 8, 2018, 6 pgs.

XAD, Inc., International Search Report and Written Opinion, PCT/US2016/060727, dated Mar. 31, 2017, 7 pgs.

* cited by examiner

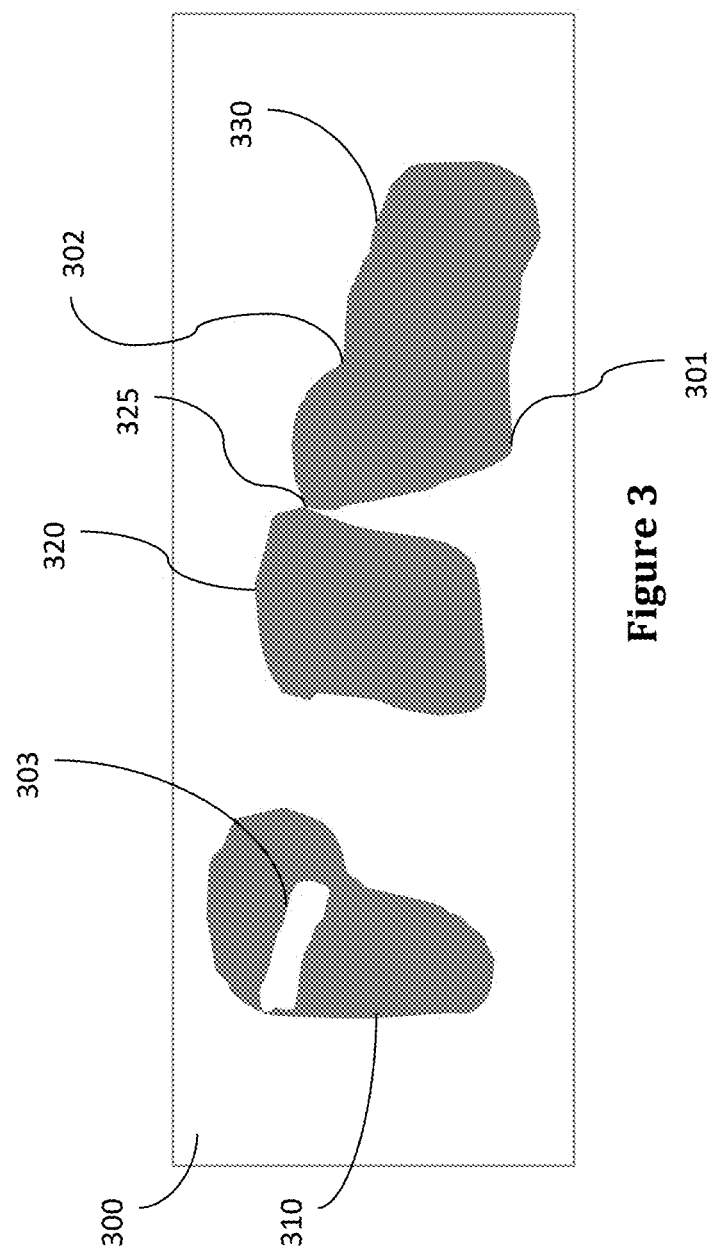

METHOD AND APPARATUS FOR DYNAMIC GEO-FENCING

CROSS REFERENCE TO RELATED APPLICATIONS

The present application is a continuation of U.S. patent application Ser. No. 13/867,025, filed Apr. 19, 2013, which claims the benefit of priority from U.S. Provisional Application No. 61/724,295 entitled "Method and Apparatus for Probabilistic User Location," filed on Nov. 8, 2012, U.S. Provisional Application No. 61/724,298 entitled "Method and Apparatus for Dynamic Fencing," filed on Nov. 8, 2012, and U.S. Provisional Application No. 61/724,299 entitled "Method and Apparatus for Geographic Document Retrieval," filed on Nov. 8, 2012. Each of the above applications is incorporated herein by reference in its entirety. The present application is related to commonly assigned U.S. Patent Application entitled "Method and Apparatus for Probabilistic User Location," filed Apr. 19, 2013, now U.S. Pat. No. 9,049,549, and to U.S. Patent Application entitled "Method and Apparatus for Geographic Document Retrieval," filed on Apr. 19, 2013, now U.S. Pat. No. 9,210,540, each of which is incorporated herein by reference in its entirety.

FIELD

The present disclosure is related to location-based mobile applications, and more particularly to method and system for dynamic geo-fencing.

DESCRIPTION OF THE RELATED ART

Hyperlocal advertising is the ability to deliver precise, relevant, and timely advertising to consumers based on estimate of their location at the moment of delivery. Nowadays, with the advent of smartphones and tablets, hyperlocal advertising is becoming increasingly popular among online marketers as a vehicle of choice to deliver their messages to targeted mobile audiences on mobile devices. Various industry experts predict over 1.5 trillion mobile consumer page views a month, translating to hundreds of billions of ad impression opportunities a month, or billions a day. There are currently an estimated 20 million stores and small businesses located in the US alone.

Geo-Fencing or location-based targeting involves sending information or push notifications to consumers who enter virtual perimeters set around physical places. Such technologies allow an advertiser to create a virtual "fence" around a point or place of interests. For example, an advertiser can pinpoint a store, and deliver a specific advertisement ("ad") to anyone who comes within a pre-defined geographic area around that store. Ads delivered through geo-fencing typically yield higher hit rate and better return of investment for advertisers since they're more contextual.

SUMMARY

Embodiments of the present disclosure provides apparatus and methods for generating dynamic fences representing geographical regions where advertisement campaigns can take place. The dynamic fences can have arbitrary shapes. In one embodiment, the dynamic fences can include both convex and non-convex corners/curves. In a further embodiment, the shapes and sizes of the dynamic fences can vary over time. The methods according to certain embodiments include a framework and an objective function that combine data from multiple sources to shape the dynamic fences according to goals set by advertising campaigns.

In one embodiment, a method for generating dynamic fences derives the shapes of the dynamic fences based on historical and predicted information such as data suggesting optimal allocation of existing inventory, predicted click-through rates and secondary action rates, as well as parameters explicitly specified by advertisement campaigns (e.g. target a specific point of interest or highway). This allows hyperlocal advertising to have the flexibility to fine tune represented areas targeted by a hyperlocal ad campaign.

In certain embodiment, the dynamic fences can change over time and in real-time. For examples, within a day, they can change depending on various variables such as intra-day patterns (work versus home); during a week, they can change according to intra week patterns (week day versus weekend). The dynamic fences can also change based on user mobility (commuting, working or at home). The dynamic fences can also change based on historical user behavior such as ad clicks, secondary actions such as secondary actions and maps/directions, as well as other feedback. The changes can be over time periods as rapid as the data flow allows. These aspects of the embodiments help to reduce wasted ad impressions, improving click through rates and secondary action rates.

Further embodiments of the present disclosure provide means for an advertiser to interact with a user interface (UI) or application program interface (API) to define and visualize the dynamic fence, to see how it changes during the course of the day, and to make adjustments using the parameters provided through the UI or API. Thus, advertisers are able to tune the dynamic fences based at least in part on criteria such as keywords, categories, demographic targeting, volume of impressions, clicks and secondary actions.

Further embodiments of the present disclosure provide business methods that enable advertisers to carry out real-time competitive conquest by targeting regions in a map where users are likely engaged with their competitors in real-time.

Further embodiments of the present disclosure provide business methods that enable advertisers to perform real-time point-of-interest targeting by targeting a region in a map associated with a point-of-interest (e.g. a neighborhood, a section of an interstate highway) where their target users are mobile in real-time.

BRIEF DESCRIPTION OF THE DRAWINGS

FIG. 3 is a diagram illustrating an example of a region with arbitrary shape composed of a few contiguous closed regions.

DESCRIPTION OF THE EMBODIMENTS

According to certain embodiments, geographical representation of objects and/or virtual regions or fences around the objects is generated based on signals from historical events associated with these objects. These regions are generated to capture as much relevant signals as applicable and can change during the course of the day and day after day. The regions so generated represent areas to be targeted in location-based applications, including, but not limited to:

Local advertising, where advertisements can be displayed for any kind of business, for both search and display advertising.

Local search, where fences that define area of relevance for any type of business can be computed.

Social, where a fence defining an area in which social connections for a specific individual is more likely to be effective, e.g. the best area to make friends etc.

Figure 1A:
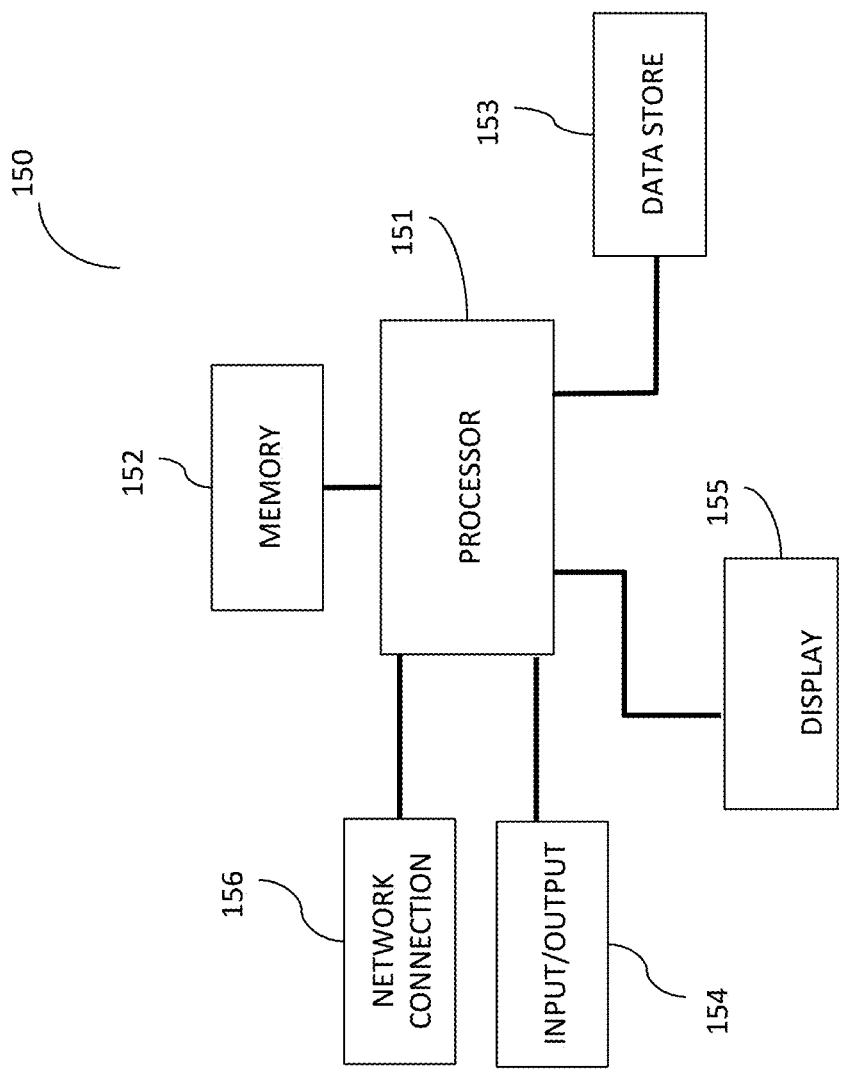
FIG. 1A is a block diagram illustrating a computer system that can be used to carry out a method for dynamic fencing according to one embodiment of the present disclosure.

A computer system (e.g., a server computer) executing a software program can be used to generate the virtual regions or fences. FIG. 1A is a block diagram of an example of such a computer system 150, which includes a processor 151, a memory 152, one or more data stores 153, input/output devices 154 such as keyboard/mouse/touchscreen, one or more display devices 155, such as a monitor, a wired and/or wireless connections 156 to a network, such as a local area network and/or a wide area network (e.g., the Internet 120). The software programs can be stored in a computer readable medium (such as a data store 153 and or other portable computer readable medium that is not shown). When loaded in the memory 152 and executed by the processor 151, the software programs cause the processor to carry out methods for generating dynamic fences described herein. In one embodiment, location-based documents/information and historical, aggregate data collected from many requests from mobile devices are also stored in the data store 153. The one or more data stores 153 can be computer readable media local to the processor 151 and/or coupled to the processor via a local or wide-area network.

Figure 1B:
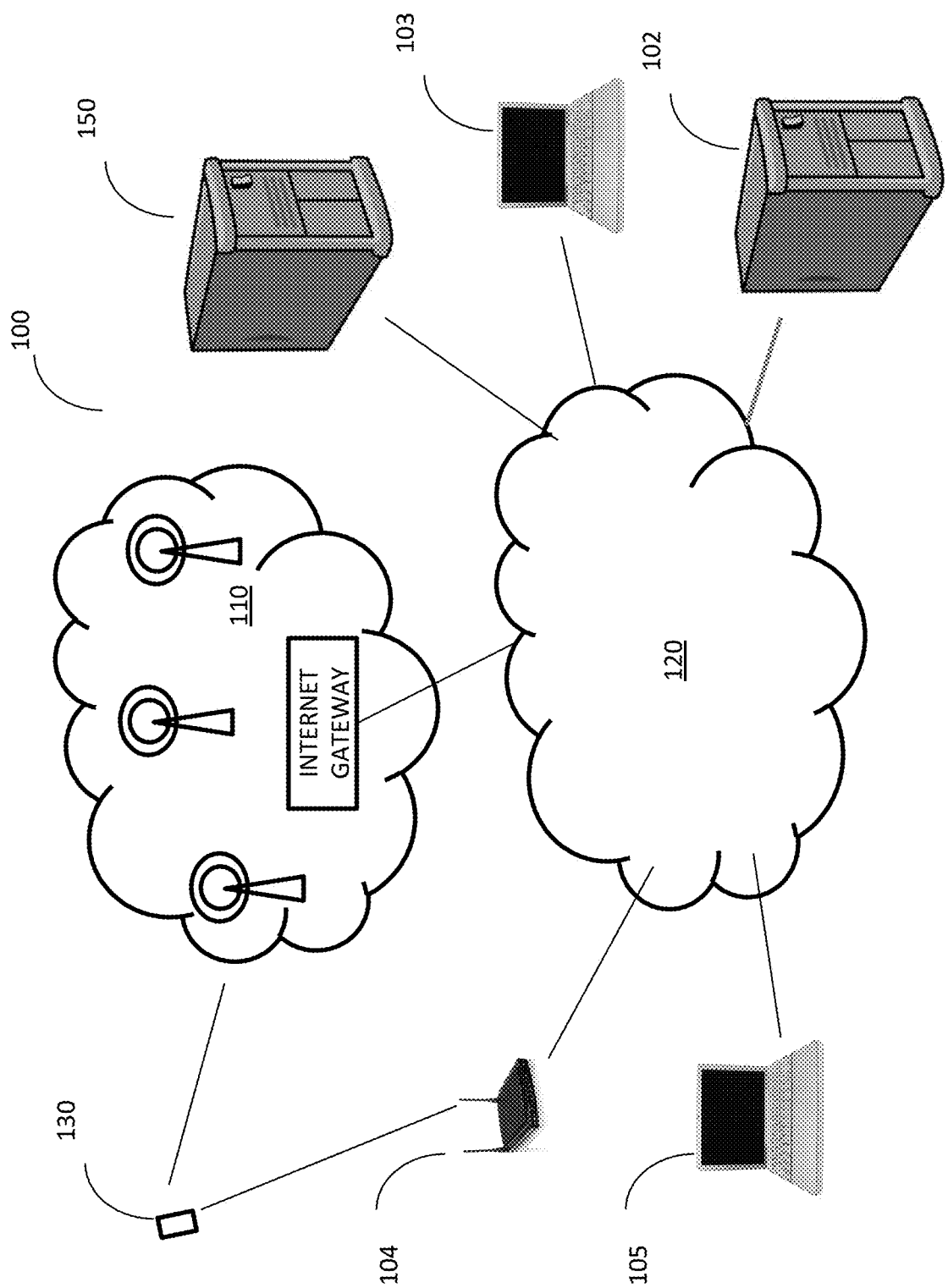
FIG. 1B is a diagram illustrating a packet-based network via which a mobile device may interact with one or more servers according to one embodiment of the present disclosure.

FIG. 1B illustrates a packet-based network 100 (referred sometimes herein as "the cloud"), which, in some embodiments, includes part or all of a cellular network 110, the Internet 120, and computers and servers coupled to the Internet. The computers and servers can be coupled to the Internet 120 using wired Ethernet and optionally Power over Ethernet (PoE), WiFi, and/or cellular connections. As shown in FIG. 1B, a mobile device 130 such as a smart phone is also coupled to the packet-based network via WiFi or cellular connections. When a WiFi hotspot (such as hotspot 104) is available, the mobile device 130 may connect to the Internet via the WiFi hotspot using its built-in WiFi connection. Mobile device 130 may also communicate with the cellular network using its built-in cellular connection to connect to the cellular network 110, which is coupled to the Internet via an Internet Gateway. Thus, the mobile device may interact with other computers/servers coupled to the Internet.

As shown in FIG. 1B, the computers/servers coupled to the Internet may include one or more computers/servers 150 that is used to execute the software programs to carry out methods for generating dynamic fences according to certain embodiments. They may also include one or more computers/servers 102 associated with a mobile publisher, one or more computers/servers 103 associated with an on-line marketer, and other computers/servers 105.

Figure 1C:
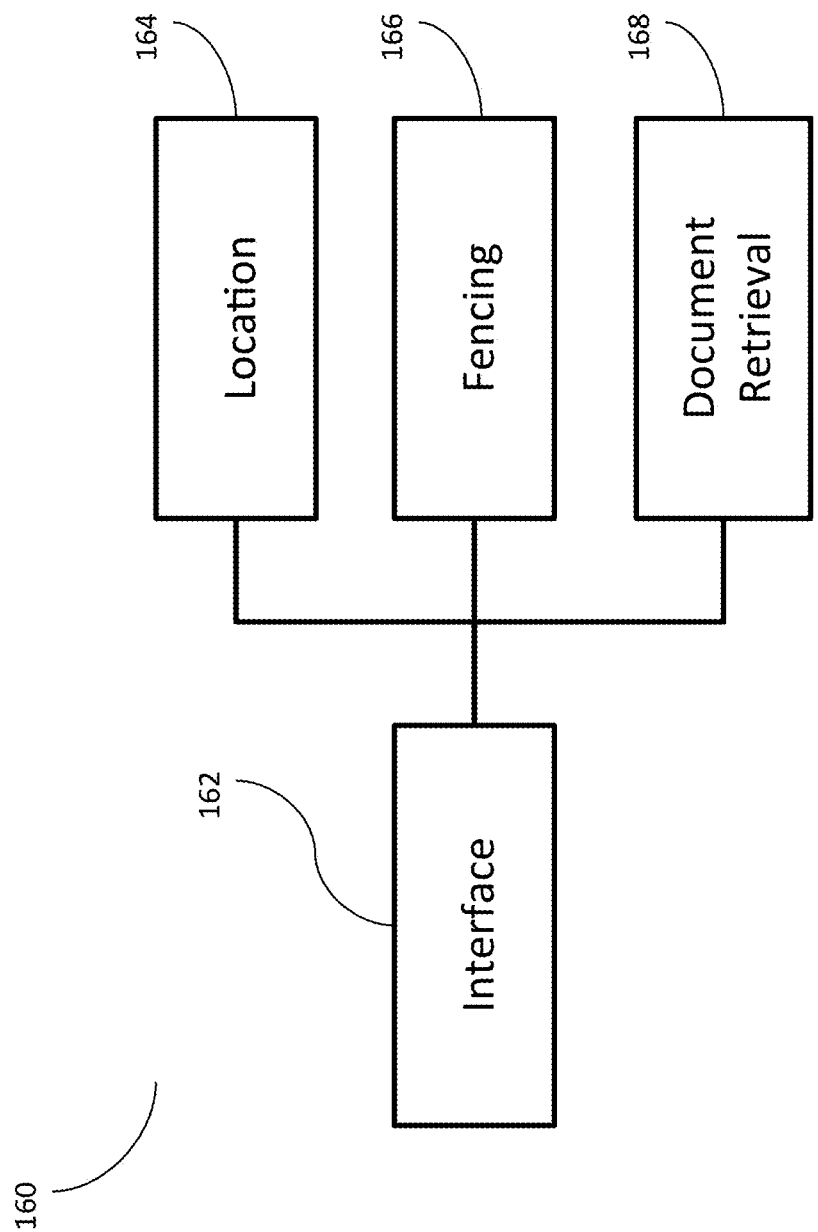
FIG. 1C is a block diagram illustrating a few software engines in the computer system of FIG. 1A according to one embodiment.

As shown in FIG. 1C, in one embodiment, the one or more servers 150 executing the software programs may provide one or more software engines or application programming interfaces (API) 160, including, for example, an interface engine 162 and a fencing engine 166. In a further embodiment, the one or more servers 150 executing the software programs may also include a location engine 164 and/or a document retrieval engine 168.

Figure 1D:
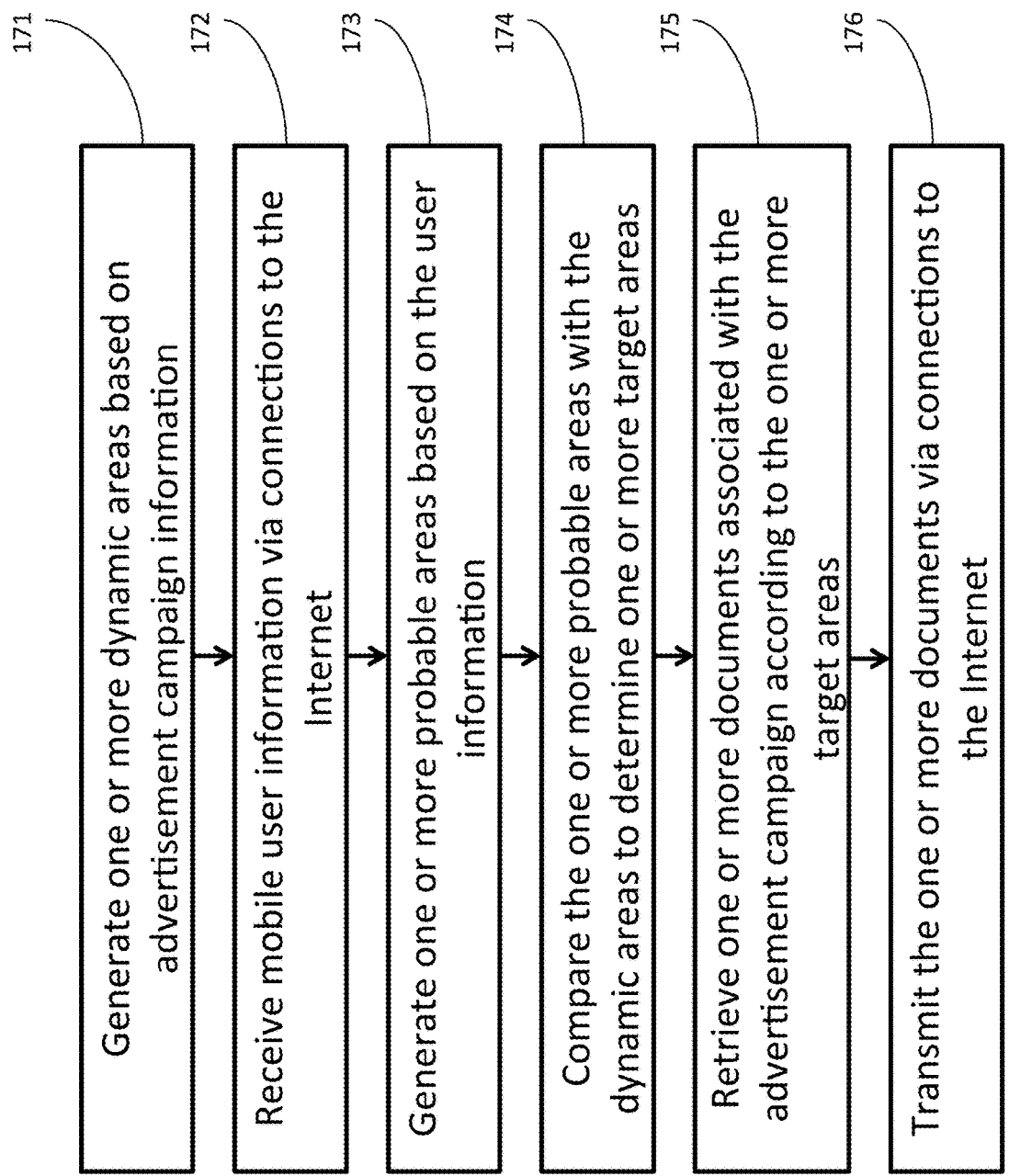
FIG. 1D is a flowchart illustrating a method for dynamic fencing carried out by the one or more servers in the packet-based network of FIG. 1 according to certain embodiments.

FIG. 1D is a flowchart illustrating a method carried out by the one or more servers executing the software programs according to certain embodiments. As shown in FIGS. 1C and 1D, according to one embodiment, in the context of on-line advertisements, the fencing engine 166 is used to carry out the methods for generating 171 dynamic areas/fences associated with an advertisement campaign based on campaign information, which can be received by the interface engine 162. The interface engine 162 is also used to receive 172 mobile user information via the connections 156. The mobile user information may include location information provided by a mobile publisher, with whom the mobile user has initiated interaction using the mobile device via one or more web services or applications provided by the mobile publisher. The interface engine 162 forwards the mobile user information to the location engine 164, which is used to generate 173 one or more probable areas where a user of a mobile device ("mobile user").

In one embodiment the one or more probable areas can simply be an area associated with the location information. For example, if the location information includes a zip code, the one or more probable areas can be an area associated with the zip code. In a further embodiment, the location engine is used to carry out a method described in the co-pending commonly owned U.S. Patent Application entitled "Method and Apparatus for Probabilistic User Location," filed on even date herewith, and generates the one or more probable areas with their associated weights or probabilities.

The document retrieval engine 168 is configured to compare the one or more probable area with the one or more fenced areas to determine 174 one or more target areas, and to retrieve 175 one or more documents (e.g., advertisement), which can be delivered 176 to the mobile user using the interface engine 162. In one embodiment, each target area has an associated probability and the document retrieval engine chooses an advertisement associated with a target area with the highest probability. In another embodiment, the document retrieval engine performs a coin toss using the probabilities associated with the target areas as weight to choose an advertisement for delivery in response to the ad request. In a further embodiment, the document retrieval engine is configured to carry out a method described in the co-pending U.S. Patent Application entitled "Method and Apparatus for Geographical Document Retrieval," filed on even date herewith, to retrieve the document. The interface engine 162, location engine 164, fencing engine 166 and document retrieval engine 168 can be provided by one computer/server 150 or multiple computers/servers 150.

Figure 1E:
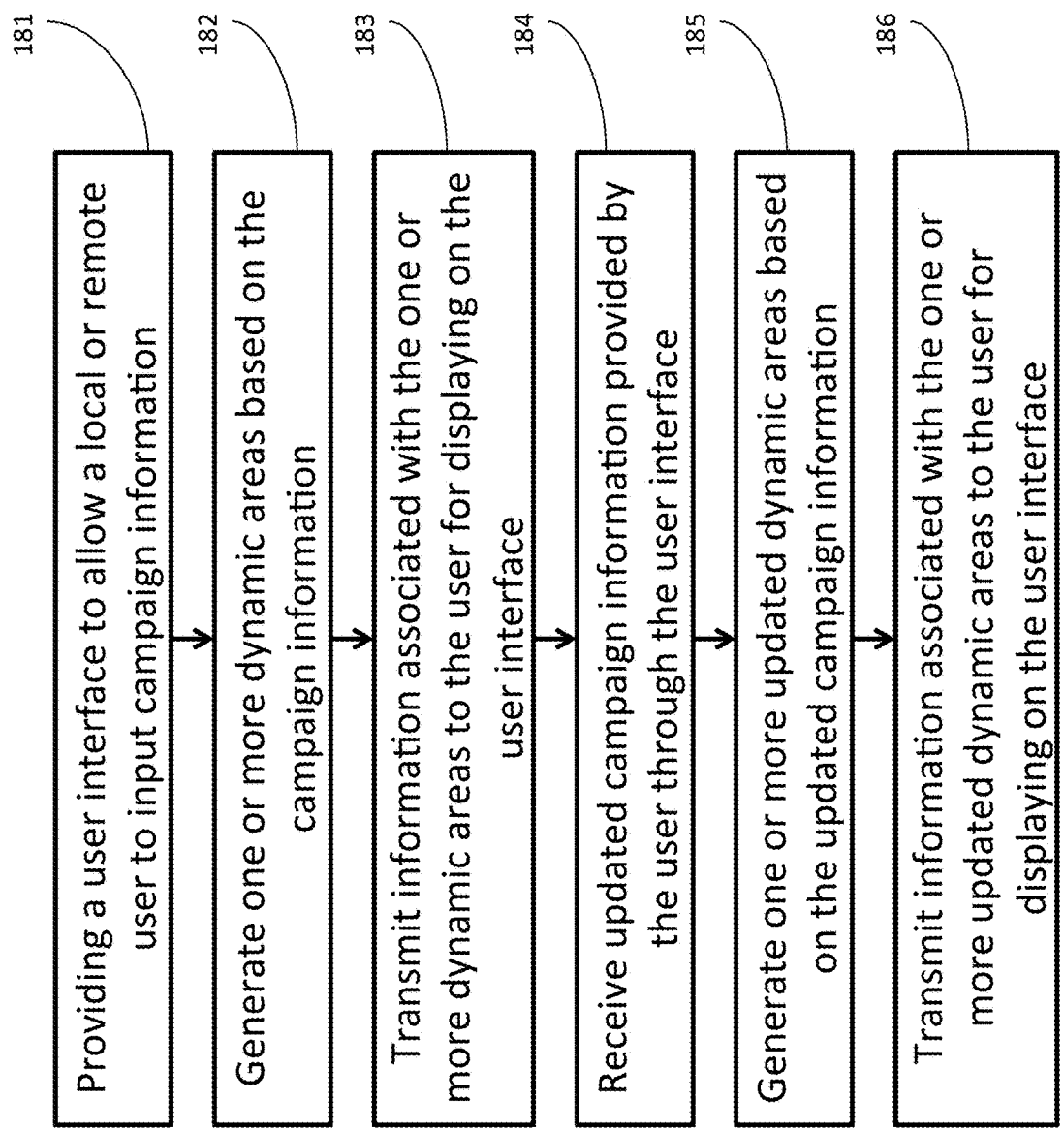
FIG. 1E is a flowchart illustrating a method for updating dynamic fencing information carried out by the one or more servers in the packet-based network of FIG. 1 according to certain embodiments.

The fencing engine 166 can be run separately from the location engine 164 and/or the document retrieval engine 168. In one embodiment, as shown in FIG. 1E, the fencing engine 166 is further configured to provide 181 a UI or API to allow a local user or a remote on-line marketer 102 to interact with the fencing engine 166 via the UI or API locally or over the Internet 120. The on-line marketer 102 or a local user can input campaign information associated with an advertisement to the fencing engine 166, which generates 182 one or more dynamic fences or areas based on the campaign information and delivers 183 the one or more dynamic areas to the local user or on-line marketer for display on the UI or API. The one or more areas or regions delivered by the fencing engine can be arbitrary (meaning that they are not attached or associated with any prescribed or pre-established boundaries, or restricted to certain shapes) and/or dynamic (meaning that they can change in shapes and sizes depending on the time of the day). Thus, the local user or on-line marketer 102 can use the results from the fencing engine 166 to tune the campaign information and compare the dynamic areas generated using different campaign information so as to reach an optimized result for the advertisement campaign.

In a further embodiment, as shown in FIG. 1E, the fencing engine 166 is further configured to receive 184 updated campaign information via the UI or API, generate 185 one or more updated dynamic fences or areas based on the updated campaign information, and deliver 186 the one or more updated dynamic fences or areas to the local user or on-line marketer for display on the UI or API.

One important characteristic of dynamic fencing is that the shape of the fence may vary depending on the time of the day.

Thus, embodiments in the present disclosure provide a dynamic fencing method executed by a computer system to determine the boundaries of a geographical region of arbitrary shape, called dynamic fence, where advertisements for a certain advertisement campaign are displayed on mobile devices. Impressions for an ad campaign enabled with dynamic fencing take place when the location of a user of a mobile device 101 is inside the fence generated. One important characteristic of dynamic fencing is that the shapes and sizes of the fences may vary over time. Therefore, the dynamic fences are time-dependent and may change in shapes and sizes depending on the time of day, day of the week, day of the month, holidays and/or other time-dependent aspects. One typical example is that the fence for a restaurant may cover larger areas around lunchtime and smaller areas at night. Further more, the dynamic fences may change in real-time based on continuously updated historical data as allowed by data pipelines implemented in the cloud.

These and other aspects of the embodiments are described in further details with respect to the following examples:

A retail chain uses hyper-local advertising to let consumers in the neighborhood of their physical stores know of in-store sale items hoping to attract them into the stores;

The owner of a fast-food franchise targets users who are commuting down an adjacent highway to promote their new hearty and healthy lunch combo;

A dentist who is new in town wants to acquire new customers in nearby residential areas;

An electronic retailer wants to advertise to customers who are near or in competing retailers in a same area (e.g., a city or shopping mall); and A sports gear retailer wants to target sports fans in a stadium attending a baseball game, and later in adjacent highways as they leave the game.

In one embodiment, a business is represented by a data structure $B=(B_{lat}, B_{lon}, B_{cat}, B_{dem})$, wherein $B_{lat}$ and $B_{lon}$ represent geographical coordinates of the business' physical presence, $B_{cat}$ represents a category of the business, and $B_{dem}$ defines the business' demographic of target customers. Let $b_{i,t}=(lat_i, lon_i, w_{i,t})$ be a control point of coordinates $lat_i$ and $lon_i$ where $w_{i,t}$ is a number that represents an amount of interest that mobile users that belong to the demographics $B_{dem}$ and are present in the neighborhood of $(lat_i, lon_i)$ at the moment in time t have on a business of category $B_{cat}$ located at $(B_{lat}, B_{lon})$. In some embodiments, effective advertising campaigns for businesses in the neighborhood of $(B_{lat}, B_{lon})$ that belong to category $B_{cat}$ have a maximum effective targeting area $ETA_{B,t}$, which is dependent on a few variables, e.g., $$ETA_{B,t}=\text{EffectiveArea}(t,B_{lat},B_{lon},B_{cat}),$$

and a dynamic fence is generated by calculating a geographic region $R_{B,t}$ where advertisements from business B are displayed in mobile devices in a moment in time t, such that $$\text{Area}(R_{B,t}) \leq ETA_{B,t},$$

and that the objective function below is maximized $$MAX \Sigma_{contains(R_{B,t}, b_{i,t})} w_{i,t}.$$

In such embodiments, the dynamic fence defines a region with arbitrary shape whose size can be limited by the ETA. In that sense, the ETA can be an input parameter for dynamic fencing.

Figure 2A:
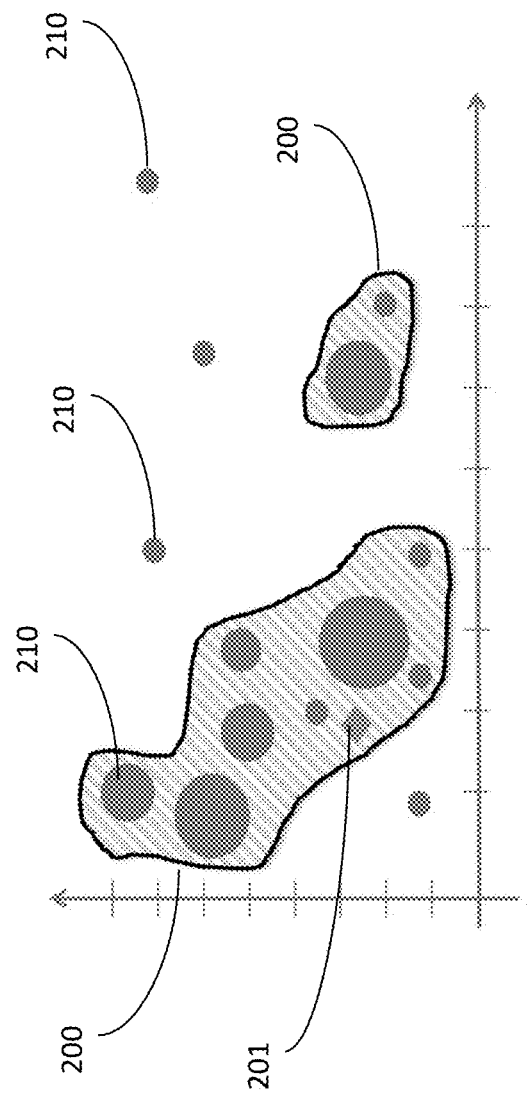
FIG. 2A is a diagram illustrating an example of dynamic fences and control points showing overlap between dynamic fences and control points.

FIG. 2A shows an example of dynamic fences 200 for a business 201 that contains several control points with high values of $w_{i,t}$. FIG. 2A also illustrates an example of overlap between dynamic fences 200 and control points 210.

Figure 2B:
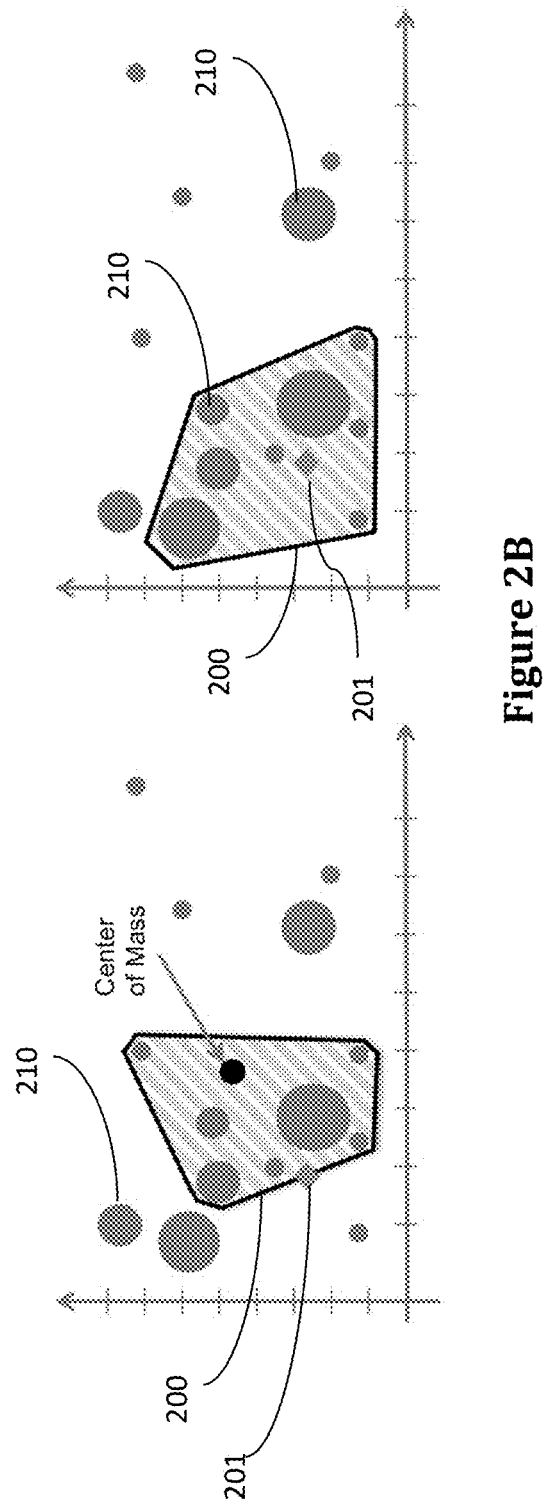
FIG. 2B is a diagram illustrating examples of certain naive solutions that use convex polygons (i) around the center of mass of control points (left) and (ii) around the business (right), respectively.

A simple way of generating dynamic fences includes generating convex polygons either around the business location or around the center of mass of the control points. FIG. 2B shows examples for such naive solutions that use convex polygons 200 (i) around the center of mass of control points 210 (left) and (ii) around the business 201 (right), respectively. These naïve solutions are limited by the shape of the region generated, a single convex region in both cases. In both cases, the convex region can't extend far enough to encompass key control points because in both cases the convex polygons would have to cover empty areas that would cause the convex polygon to grow beyond the maximum area size ($ETA_B$). Solution that are not constrained to generate convex regions can outperform such naive processs due to the flexibility they provide to the objective function. Solutions that generates regions with arbitrary shapes are thus more desired. Regions with arbitrary shapes can be composed of disconnected regions and/or non-convex corners/curves and/or holes, as discussed further below.

In one embodiment, the fencing engine 166 takes as input some or all of the following input parameters associated with an advertisement campaign:
  Location of the business advertised. It can be one of the following:
    Latitude and longitude coordinates.
    Name or address of the business to be advertised.
  Location targeted. Optional parameter. The location targeted can be one of the following:
    Latitude and longitude coordinates.
    Name or address of the business or point of interest to be targeted. Example: Times Square, N.Y.
    Sequence of coordinates representing a path to be targeted.
    Name or description of road or segment of road. Example: El Camino Real between Lawrence Expressway and Mathilda Avenue
  Time.
    Time of day
    Date
  Volume priority. This is a tuning parameter used by advertisers to increase the number of impressions, regardless of the ratio of the clicks and secondary actions. Possible values are in the [0,1] range.
  Click priority. This is a tuning parameter used by advertisers to increase the focus of the campaign on maximizing the click through rate. Possible values are in the [0,1] range.
  Secondary action priority. This is a tuning parameter used by advertisers to increase the secondary action through rate. Possible values are in the [0,1] range.
  Targeting demographics
    Age
    Gender
    Income
    Race/Ethnicity
    Marital status
    Others
  List of categories and/or keywords related to the ad campaign The above data can be input via the UI or API provided by the fencing engine. Advertisers can initiate such interaction via an API call and can tune the advertising campaigns through changes to the values of the above-listed parameters through the UI or API, which can also display the dynamic fence generated, as discussed in further detail below.

In one embodiment, the fencing engine 166 can generate as its output one or more regions of arbitrary shapes. A region with arbitrary shape R may include a set of one or more contiguous closed regions R={$r_1, r_2, \ldots, r_n$} where each contiguous region $r_i$ has an external boundary $e_i$ and a set of one or more internal boundaries {$k_{i1}, k_{i2}, \ldots, k_{im}$}. Each boundary b, external or internal, can be defined by a sequence of points b=seq{$p_1, p_2, \ldots, p_n$}. A point p can have two coordinates, latitude and longitude.

In one embodiment, the external boundaries of two contiguous closed regions that belong to the same arbitrary region can only touch on a single point. Likewise, an internal boundary of a contiguous closed region can only touch another internal boundary on a single point.

In a further embodiment, an internal boundary of a contiguous closed region can only touch the external boundary of the region on a single point. FIG. 3 shows one example of a region 300 with arbitrary shape composed of three contiguous closed regions 310, 320, and 330. Region 310 has one internal boundary 303. The remaining two contiguous closed regions 320 and 330 touch at a single point 325. As shown in FIG. 3, these regions 310, 320 and 330 have arbitrary shapes and can include both convex corners/curves 301 and non-convex corners/curves 302, and can have holes 303.

Figure 4:
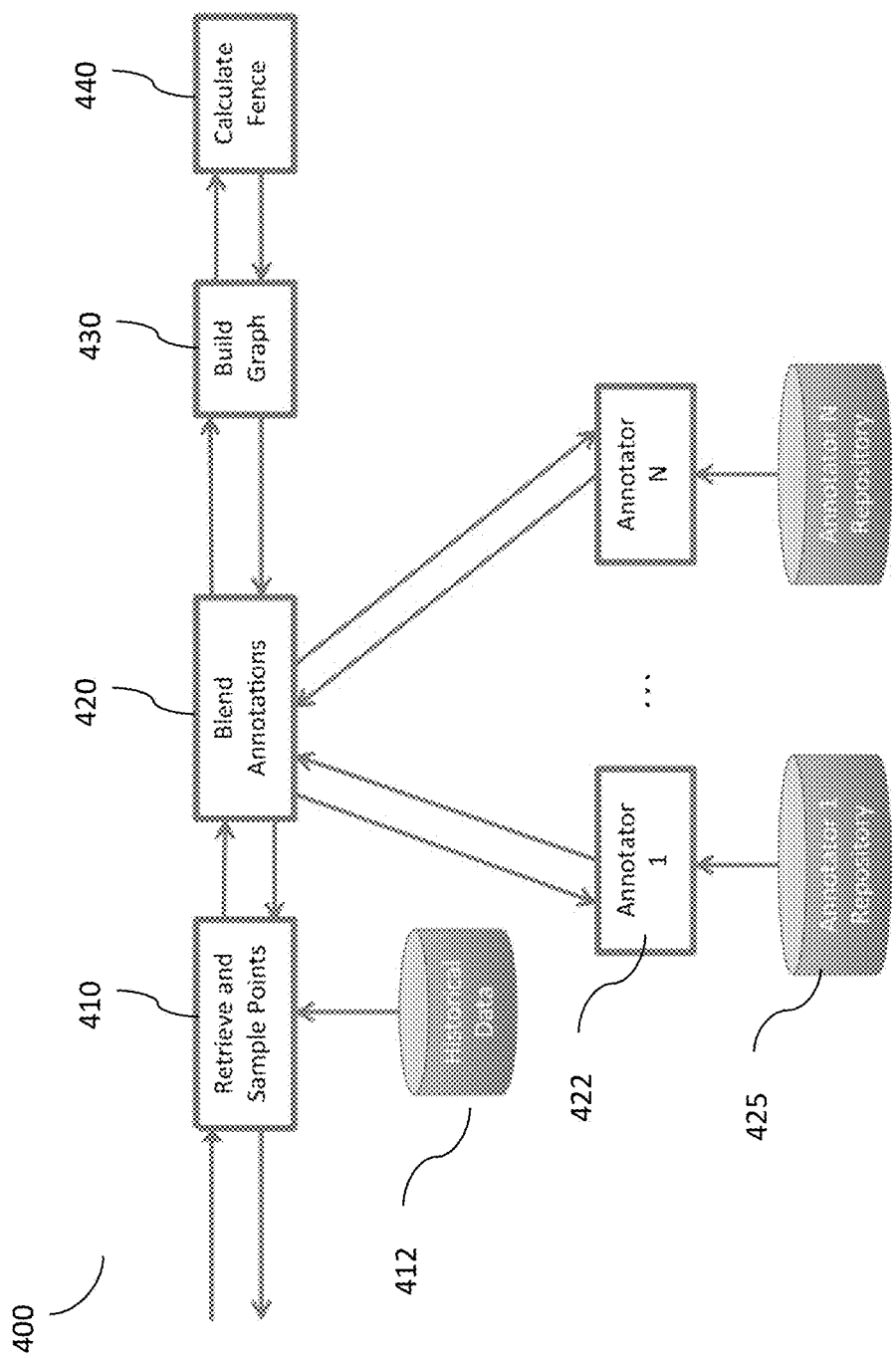
FIG. 4 is a high level logical view illustrating a process for generating dynamic fences according to certain embodiments.

FIG. 4 is a high level logical view illustrating a process 400 for generating dynamic fences according to certain embodiments. As shown in FIG. 4, process 400 includes obtaining 410 a set of control points relevant to the dynamic fence based on input campaign information by retrieving and sampling (randomly picking some of the) points, or geographical coordinates, extracted from historical data or other sources associated with geographical locations. The control points represent locations associated with ad impressions, clicks, and/or secondary actions collected from mobile devices. The choice of control points represents an adaptative approach that uses knowledge about where impressions, clicks and conversions are generated in order to shape the fence. The sampling strategy for control points is a function of tuning parameters provided by advertisers via the API as well as of the level of precision/resolution desired for the dynamic fence.

The process 400 further includes annotating 420 the control points with data that adds signal from keywords (or categories). For example, if a control point is in the neighborhood of several restaurants, the control point can be annotated with the tuple (category="restaurants", signal=0.5). Multiple annotations of the same keyword (or category) to the same control point can be combined into a single annotation.

The process 400 further includes producing 430 a topological data structure (TDS) using the control points and annotations. The TDS divides a region covered by control points into small regions, called faces. The process 400 further includes generating 440 the dynamic fence using the TDS by combining the faces.

Certain logical aspects of the process 400 are described in further detail below. At a high level, according to one embodiment, a dynamic fence can be generated by: (i) subdividing a region into faces; (ii) selecting a subset of faces; and (iii) collapsing the subset of faces to generate the dynamic fence.

In one embodiment, to subdivide a geographic region, the neighborhood of a targeted location is divided into small areas, $s_1, s_2, \ldots, s_n$, called faces, such that each control point $p_i$ is associated with a face $s_i$. An objective function is used to bring as many faces with high weights as possible into a final region.

In one embodiment, in a so-called greedy process for calculating a dynamic fence, the density of each face is computed as $$d(s_i) = \frac{w_i}{\text{area}(s_i)},$$

and all of the faces are sorted in descending order of density. Then the top most dense faces are merged while keeping dynamicFenceArea≤ETA. The complexity of this process is the complexity of the sorting step O(N*log(N)) as the sorting step dominates the process. This greedy process produces optimal results in cases where all of the faces have about the same size.

For faces with distinct sizes, the greedy process is not optimal due to, for example, a corner case where the following conditions happen: (i) dynamicFenceArea<ETA and (ii) There is a face $s_j$ not included in the dynamic fence, with lower density, greater $w_j$ and greater area ($s_j$) that could replace one of the faces included in the dynamic fence, increasing the result of objective function while still keeping dynamicFenceArea≤ETA. In real-life scenarios with dynamic fences with tens of thousands of faces, any processs that attempt to improve the greedy process by reducing the difference (ETA—dynamicFenceArea) would produce negligible improvements. Therefore, it is unnecessary to invest in complex heuristics and expensive combinatorial processs to address such corner cases.

Figure 5:
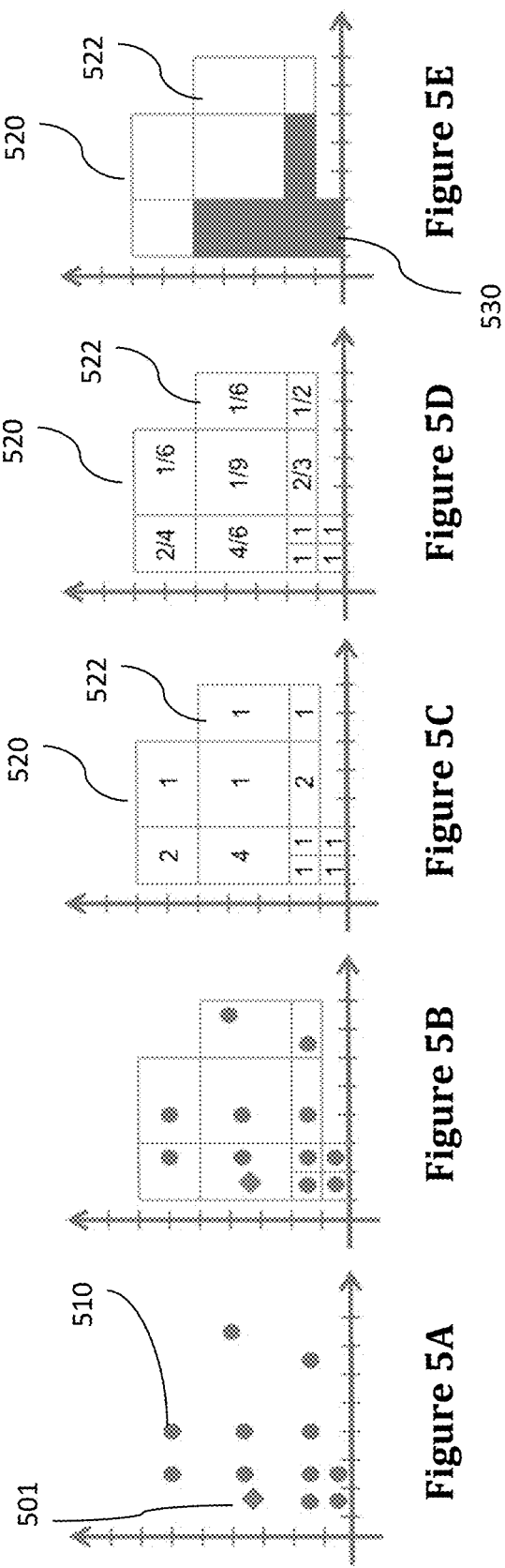
FIG. 5A-5E are diagrams illustrating an example of a dynamic fence being shaped by an objective function according to embodiments.

FIGS. 5A-5E show an example of how the objective function shapes a dynamic fence. FIG. 5A shows an example of a set of control points 510 for a location 501 targeted for an advertisement campaign. FIG. 5B shows how a geographic region 520 that surrounds the control points is subdivided into eleven faces 522. FIG. 5C shows signal strength in each face. FIG. 5D shows density for each face. FIG. 5E shows how the objective function shapes the dynamic fence. Assuming that the ETA is thirteen square units, the objective function selects six top density faces to form the dynamic fence.

As shown in FIG. 4, in certain embodiments of the process 400, a set of control points that match location, time, demographics, keywords and categories passed by the API are identified in 410. The control points can be a subset of locations from historical data 412 that are known to be associated with secondary actions, clicks and impressions. Each control point may have some initial annotations, such as the following:

("IMPRESSION", 0 or 1)
("CLICK", 0 or 1)
("SECONDARY ACTION", 0 or 1)

where "1" indicates that the control point had a least one impression (click or call) in the past, and "0" indicates otherwise. Only one of the annotations is usually applied to a control point.

Note that such time dependent approach for control point retrieval can enable dynamic fences to vary in shape depending on the time of day, day of week, day of the month, holidays etc.

After control points are generated, in 420, a series of annotators 422 can process the control points and annotate each point with (keywordOrCategory, signalStrength) annotations. Each annotation has a signal strength in the (0 . . . 1] range. The annotator's model that computes the signal strength should consider using the API input parameters as input features. For example, for categories (input parameter) where proximity is correlated with clicks and secondary actions, such as "restaurants" and "gas stations", the signal strength should decay with the distance between the business location (input parameter) and the control point.

A case that requires special attention is when the advertiser targets a business or point-of-interest. In such case, the signal strength should decay with the distance between the business or target location and control point.

Annotators 422 may use historical search, display data and demand data stored in their respective repositories 425 to generate annotations. In an example in which search data is used to generate annotations, the locations of control points can be joined with nearby historical data for search and display requests. If clicks and secondary actions were generated for a cluster of searches to "restaurants", the annotators 422 can annotate nearby control points with the keyword "restaurants." The signal strength can be a function of the number and density of clicks and conversions for restaurants in the area.

The control points can also be annotated using other types of sources. In a high level example, Nielsen PRIZM could be used as an external source annotator. The Nielsen PRIZM is a set of geo-demographic segments for the United States. It assigns segments such as "Money & Brains" to geographical locations. A Nielsen PRIZM annotator could annotate control points inside regions marked by Nielsen PRIZM as "Money & Brains" with keywords associated with luxury items such as "Lexus" or "Vacation in Europe."

In certain embodiments, annotations are blended in 420 using a linear model. For example, let $A_W=(w_{a_1}, \ldots, w_{a_n})$ be a vector of weights for annotators 1 . . . n. These weights can be constant per annotator and can be tuned using an offline feedback pipeline. Now let $K_W(k, p)=(y_{a_1}, \ldots, y_{a_n})$ be a vector of weights for a control point p and a keyword (or category) k. The following formula computes the final weight W(k, p) which blends annotations for the keyword (or category) k for the control point p:

$$W(k, p) = \sum_{i=1}^{n} w_{a_i} * y_{a_i}$$

The vector of annotator weights $A_W=(w_{a_1}, \ldots, w_{a_n})$ can be tuned using a gradient descent process. The gradient descent process uses an offline pipeline that aggregates data daily for the gradient descent iterations. The gradient descent process uses an objective function that combines revenue, clicks and call data collected from historical data.

Before generating the dynamic fence, the process 400 generates a topological data structure (TDS) in 430 to subdivide the neighborhood of the target location into a set of small regions, $s_1, s_2, \ldots, s_n$, i.e, the faces. The build graph component also computes the final signal strength, $w_i$, of each face. Each face $s_i$ in the TDS corresponds to one control point $p_i$. Each face knows which faces are adjacent to it and also knows the sequence of coordinates that form its boundary.

Figure 6:
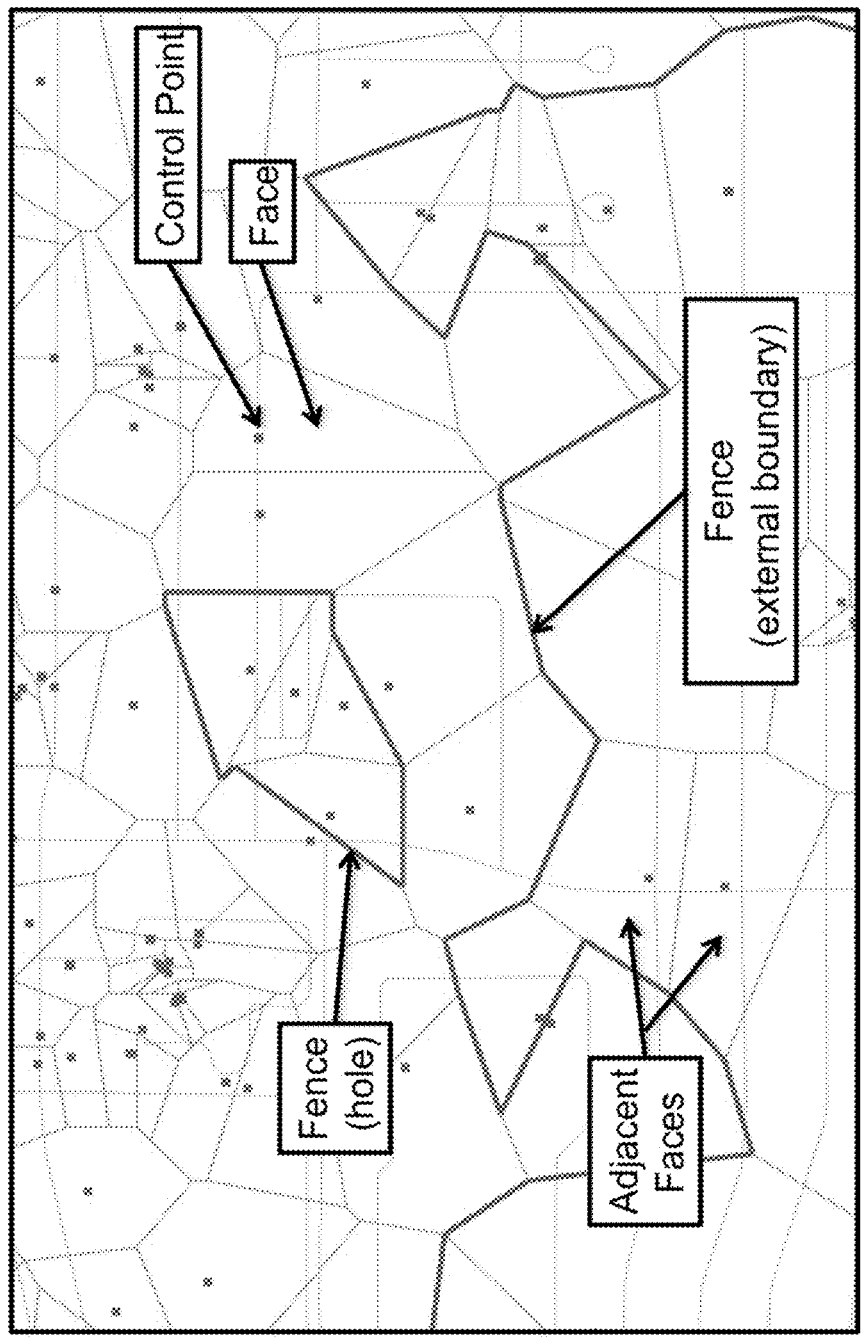
FIG. 6 is a two-dimensional view of an example of a topological data structure generated using control points, and fences generated via the combination of multiple adjacent faces according to embodiments.

FIG. 6 is a two-dimensional view of topological data structures and fences showing a real example of a topological data structure generated using control points, and fences generated via the combination of multiple adjacent faces.

In one embodiment, the weight $w_i$ for each face is computed as follows. First, a combined weight for the keywords (or categories) associated with the ad campaign is computed using a weighted average function. For example, assuming the process 400 is trying to draw a dynamic fence for a business associated with "restaurant" and "fast food" keywords, a control point $p_i$ is annotated with W(restaurant, $p_i$)=0.6 and W(fast food, $p_i$)=0.3, and the weights for the keywords "restaurant" and "fast food" are $W_{restaurant}=4$ and $W_{fastfood}=2$. The final value for the weighted average is $$\frac{(0.6*4 + 0.3*2)}{(4+2)} = 0.5.$$

In one embodiment, the result of the weighted average is multiplied by the impression, click and secondary action tuning parameters set by the advertisers. For example, assuming that the ad campaign has the priorities 1, 4 and 10 for impressions, clicks and secondary actions, respectively.

If $p_i$ is a secondary action, the value of $w_i$ after the ad campaign priority is applied is: $w_i=0.5*10=5$.

In 440 of process 400, the TDS and the weights associated with each face of the TDS are used to select a subset of faces to shape the dynamic fence. For example, when the greedy process adds a face to the dynamic fence, one of three scenarios may happen:

- The new face is not adjacent to any other face in the dynamic fence. This face becomes a new cluster of faces (with a single face).
- The new face is adjacent to one or more faces in one cluster of faces. This face is added to the cluster of faces adjacent to it.
- The new face is adjacent to faces in two or more clusters of faces. A new parent cluster is created that contains the new face and references the adjacent clusters as child clusters.

After the clusters of faces are identified, each hierarchy of clusters should be transformed in a single cluster. A trivial linear process can be used to flatten the hierarchies of clusters. Each final cluster can become a contiguous closed region. Note that the dynamic fence is represented as a collection of contiguous closed regions that form a region with arbitrary shape (see FIG. 3). The external and internal boundaries of each contiguous closed region are generated in the following way:

- The boundary between two faces is a line segment represented by two points. Every boundary of a face that is adjacent to a face that does not belong to any cluster is part of either an external boundary or internal boundary. Such line segments are marked as boundary segments.
- Adjacent marked line segments are connected in order to form loops that correspond to the external and internal boundaries of each contiguous closed region.

At this point the boundaries of each contiguous closed region are identified but it is not known yet which boundary is the external boundary. One simple solution is to calculate the area defined by each boundary. The boundary with the greatest area is the external boundary, and the remaining boundaries are internal boundaries.

In certain embodiments, external boundaries should be oriented clock-wise and internal boundaries should be oriented counter-clock wise. The orientation may be useful to display the contiguous closed regions.

The process discussed so far is linear with the number of faces. Therefore, the complexity of the process remains $O(N*\log(N))$ as previously asserted.

Optionally, the following extra steps can be applied for performance reasons:

- Drop very small contiguous closed regions and small holes.
- Simplify the boundaries of contiguous regions, through the replacement of each boundary with a new smaller sequence of points, while minimizing alterations to the geographic region covered. The simplification of boundaries can be a trivial computer graphics process extensively covered in the literature.

Small contiguous closed regions and small holes can be dropped while minimizing the impact on the result of the ranking function in that all of the faces whose contiguous closed regions fall below a given threshold are moved to a set of faces that are not assigned to any cluster.

One possible threshold could be defined as a fraction of the result of the objective function. Contiguous closed regions whose combined sum of $w_i$ is less than the threshold are excluded from the dynamic fence. The threshold should be tuned based on a proper balance between the performance improvement and the negative impact in metrics (clicks and secondary actions).

Note that the set of faces that are not assigned to any cluster includes: (i) the faces that belonged to contiguous closed regions that were just recycled and (ii) faces that were never assigned to any contiguous regions.

The greedy process that assigns faces to clusters is repeated with one exception, i.e., new clusters cannot be created. Faces can only be assigned to existing clusters or cause clusters to merge. This step is repeated until the maximum area size ETA is reached. Note that the faces don't need to be sorted again. The order set for the first run of the greedy process is reused.

In order to eliminate holes, the process should tolerate an increase in the final size of the dynamic fence by a constant factor. Again, such threshold should be tuned based on a proper balance between the performance improvement and the negative impact in metrics (clicks and secondary actions).

It is worth mentioning that eliminating small contiguous regions and holes can also help avoiding overfitting. In this context, very small contiguous regions may represent sparse historical signals (e.g. clicks and secondary actions) that may not repeat over time. Larger regions are more likely to be associated with patterns of events that repeat over time.

Figure 7:
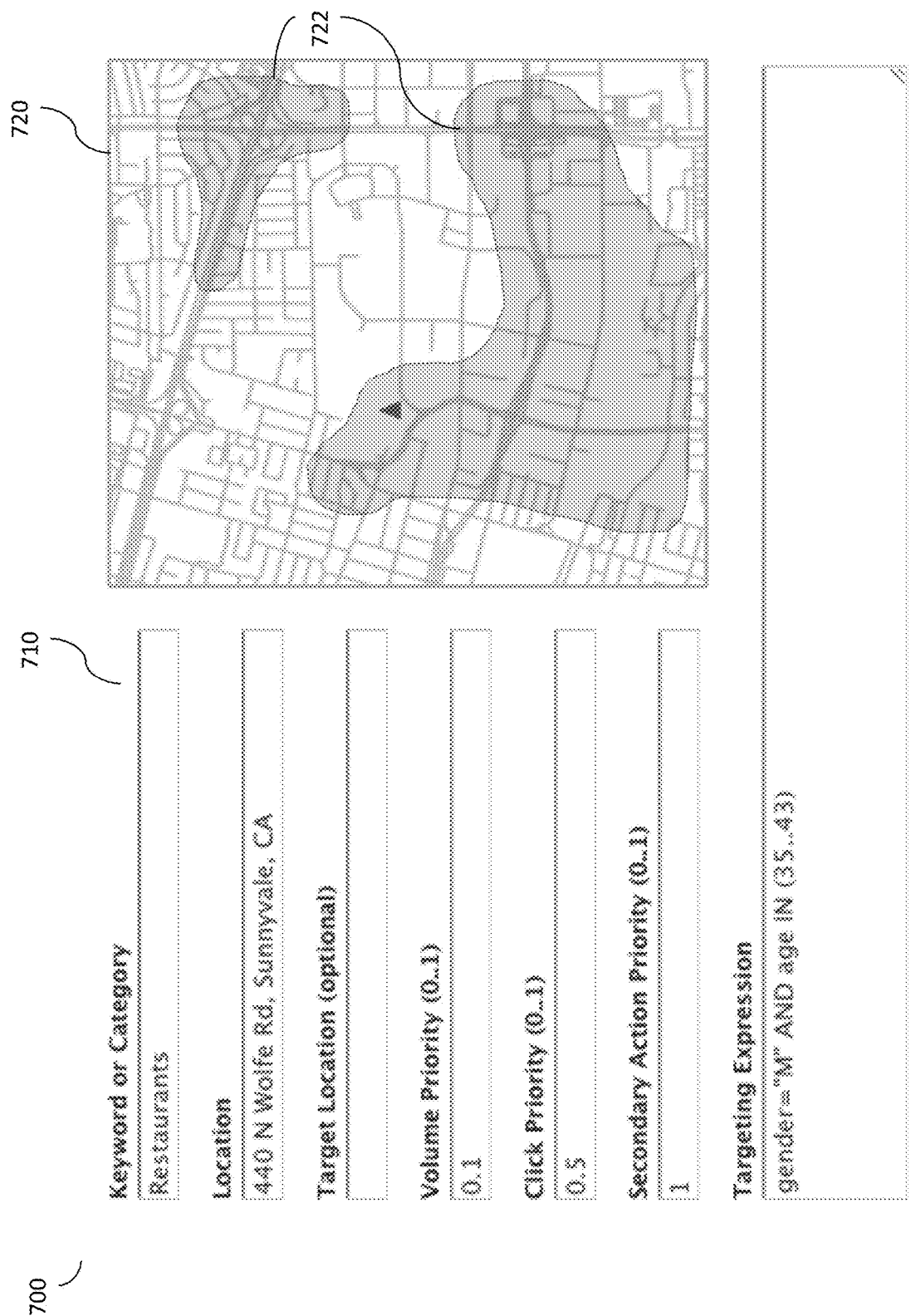
FIG. 7 is a screen capture of an example of a user interface (UI) or application program interface (API) that visualizes dynamic fences according to certain embodiments.

FIG. 7 illustrates an example of a user interface (UI) or application program interface (API) 700 that visualizes dynamic fences according to certain embodiments. Advertisers or campaign managers can use the UI or API 700 to tune dynamic fences. In one embodiment, the UI or API 700 includes a form 710 and a canvas 720. An advertiser can enter parameters that can impact the shape of the dynamic fence using the form 710. The canvas 720 displays one or more resulting fences 722 and/or an animation that shows how the fences 722 change over the course of the day. For example, as shown in FIG. 7, the parameters can include:

- Keyword or category: this could be a free form text with a drop-down list that offers suggestions as the user types into the field.
- Location or targeting location: the problem of how to find a location of a name or address is addressed by multiple geocoding solutions commercially available and is not part of claims in this document. If the name or address provided is ambiguous, the UI may display a window to the user where he chooses one of multiple options. Another alternative is to display in the canvas multiple locations and ask the user to choose one of them.
- Volume, click and secondary action priorities: an alternative to the basic keyboard input for numeric values is the use of dials or sliders to capture volume, click and secondary action priority.
- Targeting expression: it can be captured as expression typed into the text field or, optionally, each demographic targeting domain could be captured in separate fields.

The image displayed in the canvas 720 shows the state of the dynamic fence 722 at 5 PM. Instead of using an animation, the UI may offer a mechanism such as a slider or dial that the advertiser can use to visualize the dynamic fence at a specific time of day. The UI can also use stop/play buttons to stop and continue the animation on the canvas.

In one embodiment, the UI 700 in FIG. 7 can be used to implement business methods powered by dynamic fences. For example, in a business method of competitive conquest, an advertiser can use the UI 700 to target regions in a map where users are likely engaged with their competitors. For example, a Macy's department store may want to target users who are in or in the vicinity of a neighboring Bloomindale's. A BMW dealership may want to target users who are in the lot of competing brands such as Mercedes, Lexus, and Audi. In one embodiment, fences can be generated around the target areas based on user input or geographic input (i.e. the boundaries of the block in which a department store is located). Real-time data can adjust the fences generated based on geographic data. For example, intra-week variations such as higher traffic or movement over weekends can be captured Similar to competitive conquest, in a method for real-time point-of-interest (POI) targeting, made possible with time-variant dynamic fences, an advertiser can target a region in a map associated with a POI (e.g. a neighborhood, a section of an interstate highway) where their target users are mobile in real-time.

We claim:

1. A method implemented by one or more first computer systems to facilitate definition, tuning and visualization of a geo-fence at a second computer system, the second computer system being coupled to the first computer system via a packet-based network, the one or more first computer systems having access to an electronic storage, the method comprising:

storing, by a processor of the one or more first computer system, mobile device events data into the electronic storage, the mobile device events data being related to events occurring on a plurality of mobile devices communicating with the packet-based network and including, for each event, an event type, a time of the event and a location of an associated mobile device at the time of the event, the event type being one of an advertisement (ad) impression on the associated mobile device, a click on an ad on the associated mobile device, and a secondary action taken in response to an ad on the associated mobile device;

receiving, by a processor of the one or more first computer system, an application program interface (API) call from the second computer system;

in response to the API call, enabling, by a processor of the one or more first computer system, the second computer system to display an user interface (UI) on a display screen of the second computer system, the UI including a first region and a second region, the first region including a plurality of screen areas for receiving input parameters for defining and tuning the geo-fence via a user input device of the second computer system, the plurality of screen areas including a first screen area for receiving one or more keywords, a second screen area for receiving at least one location, a third screen area for receiving tuning parameters for tuning shape and size of the geo-fence; and a fourth screen area for receiving demographic definitions for the geo-fence, the second region being configured to display the geo-fence over a map of a geographical region around one of the at least one location; and in response to receiving from the second computer system user inputs in the first region, generating the geo-fence by a processor of the one or more first computer system, wherein generating the geo-fence includes:

dividing the geographical region into a plurality of geographical areas based on mobile device events data associated with a plurality of events matching the one or more keywords and the demographic definitions and with locations near the one of at least one location, determining a weight for each of the plurality of geographical areas based at least on the input parameters and the mobile device events data associated with the plurality of events, selecting a subset of the plurality of geographical areas based on the weights of the plurality of geographical areas, forming the geo-fence using the subset of the plurality of geographical areas, and causing the geo-fence to be displayed over the map in the second region of the UI, the geo-fence including one or more contiguously closed regions each formed by a clusters of adjacent geographical areas among the subset of the plurality of geographical areas.

2. The method of claim 1, further comprising:

automatically generating a series of updated geo-fences in response to changes in the mobile device events data in the electronic storage; and causing the series of updated geo-fences to be displayed as a video in the second region of the UI.

3. The method of claim 2, wherein the UI further includes a stop/play button to stop/continue the video.

4. The method of claim 1, wherein the UI further includes a mechanism to select a time for the geo-fence, the method further comprising:

automatically generating a series of updated geo-fences in response to changes in the mobile device events data in the electronic storage, each of the series of updated geo-fence corresponding to a respective time during a time period; and in response to the time selected by the mechanism of the UI, selecting a geo-fence corresponding to the selected time from the series of updated geo-fences; and causing the selected geo-fence to be displayed in the second region of the UI.

5. The method of claim 4, wherein the mechanism is a slider or dial that can be set via an input device of the second computer system.

6. The method of claim 1, wherein dividing the geographical region into a plurality of geographical areas comprises:

identifying a plurality of locations in the mobile device events data associated with the plurality of events; and dividing the geographical region into the plurality of geographical areas corresponding to respective ones of the plurality of locations.

7. The method of claim 1, wherein the input parameters include a parameter related to an effective targeting area, and wherein the subset of the plurality of geographical areas are selected such that a total area size of the subset of the plurality of geographical areas is equal to or less than the effective targeting area.

8. The method of claim 1, wherein the one or more contiguously closed regions include disconnected regions.

9. The method of claim 1, wherein the input parameters further include a time, and wherein the plurality of events are selected from events near the time, resulting in a shape of the geo-fence being a function of the time.

10. The method of claim 9, wherein the time is a time of a day, a day of a week, a day of a month, or a holiday.

11. A method implemented by one or more first computer systems to facilitate definition, tuning and visualization of a geo-fence at a second computer system, the second computer system being coupled to the first computer system via a packet-based network the method comprising:

receiving, by a processor of the one or more first computer system, an application program interface (API) call from the second computer system;

in response to the API call, enabling, by a processor of the one or more first computer system, the second computer system to display an user interface (UI) on a display screen of the second computer system, the UI including a first region and a second region, the first region including a plurality of screen areas for receiving input parameters for defining and tuning the geo-fence via a user input device of the second computer system, the plurality of screen areas including a first screen area for receiving one or more keywords, a second screen area for receiving at least one location, a third screen area for receiving tuning parameters for tuning shape and size of the geo-fence; and a fourth screen area for receiving demographic definitions for the geo-fence, the second region being configured to display the geo-fence over a map of a geographical region around the at least one location; and in response to receiving from the second computer system user inputs in the first region, generating the geo-fence by a processor of the one or more first computer system, wherein generating the geo-fence includes:

dividing the geographical region into a plurality of geographical areas based on the one or more keywords, the demographic definitions, and mobile device data associated with a plurality of mobile devices communicating with the packet-based network at locations near the at least one location, the mobile device data including historical search, display and demand data;

determining a weight for each of the plurality of geographical areas based at least on the input parameters and the mobile device data associated with the plurality of mobile devices, selecting a subset of the plurality of geographical areas based on the weights of the plurality of geographical areas, forming the geo-fence using the subset of the plurality of geographical areas, and causing the geo-fence to be displayed over the map in the second region of the UI, the geo-fence including one or more contiguously closed regions each formed by a cluster of adjacent geographical areas among the subset of the plurality of geographical areas;

wherein determining a weight of each of the plurality of geographical areas comprises:

deriving a signal strength for each keyword of the one or more keywords and for each geographical area of the plurality of geographical areas from historical search, display and demand data related to the each keyword and the each geographical area.

12. The method of claim 11, wherein the signal strength for the each keyword and for the each geographical area is a function of a number and density of clicks and conversions related to the each keyword and the each geographical area.

13. The method of claim 12, wherein the signal strength for the each keyword and for the each geographical area is made to decay with a distance between the one of the at least one location and the each geographical area.

14. The method of claim 12, wherein the tuning parameters include one or more of a volume priority, a click priority and a secondary action priority, and wherein the weight of the each of the plurality of geographical areas is determined based on the signal strength of the each of the plurality of geographical areas and one of the tuning parameters.

15. A system coupled to a packet-based network, comprising:

an electronic storage storing therein mobile device events data related to events occurring on a plurality of mobile devices communicating with the packet-based network, the mobile device events data including, for each event, an event type, a time of the event and a location of an associated mobile device at the time of the event, the event type being one of an advertisement (ad) impression on the associated mobile device, a click on an ad on the associated mobile device, and a secondary action taken in response to an ad on the associated mobile device;

one or more processors having access to the electronic storage;

a memory coupled to at least one processor of the one or more processors and storing therein program instructions, which when executed by the at least one processor, cause the at least one processor to:

receive an application program interface (API) call from a second computer system in the packet-based network;

in response to the API call, enable the second computer system to display an user interface (UI) on a display screen of the second computer system, the UI including a first region and a second region, the first region including a plurality of screen areas for receiving input parameters for defining a geo-fence via a user input device of the second computer system, the plurality of screen areas including a first screen area for receiving one or more keywords, a second screen area for receiving at least one location, a third screen area for receiving tuning parameters for tuning shape and size of the geo-fence; and a fourth screen area for receiving demographic definitions for the geo-fence, the second region being configured to display the geo-fence over a map of a geographical region around one of the at least one location; and in response to receiving from the second computer system user inputs in the first region, divide the geographical region into a plurality of geographical areas based on mobile device events data associated with a plurality of events matching the one or more keywords and the demographic definitions and with locations near the one of the at least one location, determine a weight for each of the plurality of geographical areas based at least on the input parameters and the mobile device events data associated with the plurality of events and the tuning parameters, select a subset of the plurality of geographical areas based on the weights of the plurality of geographical areas, generate the geo-fence from the subset of the plurality of geographical areas, and cause the geo-fence to be displayed over the map in the second region of the UI, the geo-fence including one or more contiguously closed regions each formed by a cluster of adjacent geographical areas among the subset of the plurality of geographical areas.

16. The system of claim 15, wherein the program instructions when executed by the at least one processor further cause the at least one processor to:

automatically generating a series of updated geo-fences in response to changes in the mobile device events data in the electronic storage; and causing the series of updated geo-fences to be displayed as a video in the second region of the UI.

17. The system of claim 15, wherein the UI further includes a mechanism to select a time for the geo-fence, wherein the program instructions when executed by the at least one processor further cause the at least one processor to:

automatically generating a series of updated geo-fences in response to changes in the mobile device events data in the electronic storage, each of the series of updated geo-fence corresponding to a respective time during a time period; and in response to the time selected by the mechanism of the UI, selecting a geo-fence corresponding to the selected time from the series of updated geo-fences; and causing the selected geo-fence to be displayed in the second region of the UI.

18. The system of claim 15, wherein the input parameters further include a time, and wherein the plurality of events are selected from events near the time, resulting in a shape of the geo-fence being a function of the time.

19. The system of claim 15, wherein dividing the geographical region into a plurality of geographical areas comprises:

identifying a plurality of locations in the mobile device events data associated with the plurality of events; and dividing the geographical region into the plurality of geographical areas corresponding to respective ones of the plurality of locations.

20. The system of claim 15, wherein the input parameters include a parameter related to an effective targeting area, and wherein the subset of the plurality of geographical areas are selected such that a total area size of the subset of the plurality of geographical areas is equal to or less than the effective targeting area.

* * * * *